UNITED STATES PATENT OFFICE.

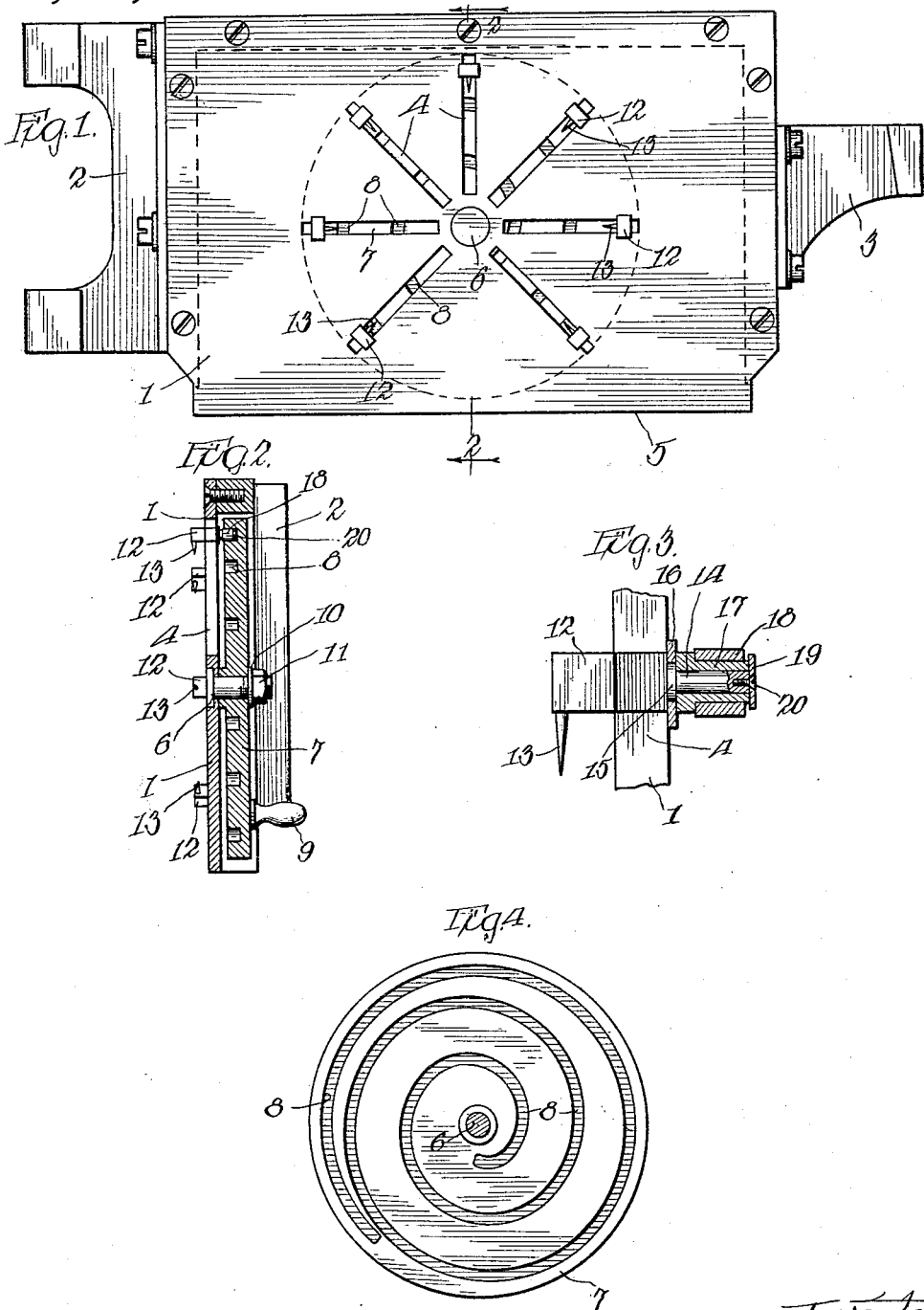

HENDRIK STUKART, OF LAPORTE, INDIANA, ASSIGNOR TO U. S. SLICING MACHINE COMPANY, OF LAPORTE, INDIANA, A CORPORATION OF ILLINOIS.

BACK PLATE FOR MEAT-SLICING MACHINES.

1,278,057.  Specification of Letters Patent.  Patented Sept. 3, 1918.

Application filed July 17, 1916. Serial No. 109,603.

*To all whom it may concern:*

Be it known that I, HENDRIK STUKART, a subject of the Queen of Holland, residing at Laporte, in the county of Laporte and State of Indiana, have invented certain new and useful Improvements in Back Plates for Meat-Slicing Machines, of which the following is a specification.

This invention relates to a device for holding the butt end of a piece of meat to be sliced by a meat-holding machine. The principal object of the invention is to provide a new and improved meat holder which can be easily attached and detached from the meat, but which will hold the meat securely for slicing. The invention consists in the features of novelty in the construction, combination and arrangement of the several parts.

In the accompanying drawing—

Figure 1 is an elevation of the back plate; Fig. 2 is a sectional view taken on line 2—2 of Fig. 1; Fig. 3 is a detail of one of the meat-holding members; and, Fig. 4 is a view of the spiral grooved device for operating the meat holders.

Although this construction is applicable for holding meat of any shape, it is particularly designed and intended for use in connection with meats such as are round in cross-section.

This device comprises a plate 1, which has a double-ended bracket 2 attached at one end thereof, and a single-ended bracket 3 attached at the other end. These brackets are for the purpose of holding the back plate on the meat-slicing machine. The central portion of the plate 1 is formed with radiating slots 4, preferably equally spaced from each other, and omitting one or more near the bottom of the plate. The reason for this is that the bottom or lower edge 5 of the back plate usually rests on a meat-holding table, and if the meat attached to the back plate is also supported by the meat table, there will be no necessity for a holding device at the bottom of the meat plate; in fact, such a holding device would tend to raise the meat from the meat table when the fastening devices of the back plate were tightened about the meat.

Extending through the plate 1, from the face thereof, is a headed pivot bolt 6, upon which a member 7 is rotated at the back of the plate 1. This member 7 is formed in the side next to the rear side of the plate 1 with a spiral groove 8, and on the other side with a handle member 9, by means of which it can be rotated. The pivot bolt 6 is provided with a washer 10, and a fastening nut 11 for holding the rotatable member 7 in place.

Slidable in each of the radiating slots 4 is a meat-engaging member 12, which extends beyond the outer face of the plate 1, and carries a sharpened projection or pin 13 on the inner side. This member 12 also extends beyond the plate 1 at the rear side thereof where it has a portion 14 reduced in section, with a shouldered portion 15 interposed between the reduced section 14 and the slidable portion in the slot 4. Mounted on the shouldered portion 15, is a washer 16, and mounted on the reduced portion 14 is a sleeve member 17, which carries an anti-friction ring 18, and is held in place at the end of the reduced portion 14 by means of a washer 19, secured thereto by a fastening screw 20. That portion of the meat-engaging member at the rear of the plate 1 is engaged by some portion of the spiral groove 8, the anti-friction ring 18 being directly engaged in the groove, and as the member is rotated all of the meat-engaging members 12 in the several slots are moved inwardly to grip the meat or outwardly from engagement therewith, in accordance with the direction of rotation of the member 7. The meat-engaging members are prevented from outward movement by the washers 16, which hold them from projecting more than a predetermined distance from the face of the plate. With this construction, it is obvious that meat can be easily attached and removed from engagement with the back plate, and when engaged it is rigidly held by the back plate.

I claim:—

1. In a meat-holding device, a plate having radiating guides therein, means for holding said plate against rotation, and meat-engaging members movable in the guides of the plate.

2. In a meat-holding device, a plate having a plurality of radiating guides, and means slidable in the guides for engaging meat held against the plate, said engaging means having radially directed pointed prongs thereon for entering the meat.

3. In a meat-holding device, a plate fixed against rotation and having a plurality of radially extending guides, meat-engaging members movable therein, and a common means for simultaneously operating all of said members.

4. In a meat-holding device, a plate having slots therethrough, meat-engaging members extending through the slots beyond both sides of the plate, means on one side of the plate to move the members in the slots, and an inwardly projecting pin on each member at the other end to engage the meat to be held.

5. In a meat-holding device, the combination with a slotted plate, of a meat-holding member extending through the slot and on both sides of the plate, a meat-engaging pin on each member at one side of the plate, and means in connection with each member on the other side of the plate to prevent movement of the member through the slot in the plate.

6. In a meat-holding device, a plate having slots extending outwardly from a given point, a plurality of meat-engaging members slidable in said slots, and means comprising a rotatable member with a spiral groove to move the members outwardly in the slots and means for preventing rotation of said plate.

7. In a meat-holding device, an upright plate having a plurality of radiating slots except below the radiating point, a meat-engaging member slidable in each slot and projecting from both sides of the plate, and rotatable means at the rear of the plate for simultaneously operating all of the meat-engaging members.

8. In a meat-holding device, a plate having a plurality of radiating slots, means for holding said plate against rotation, meat-engaging members one of which is slidable in each slot and projects beyond the faces of the plate, and means at the rear of the plate for operating all of said members simultaneously, said means comprising a rotatable plate with a spiral groove in which the ends of the members back of the plate are engaged.

9. In a meat-holding device, a slotted plate, means for holding said plate against rotation, a plurality of meat-engaging members slidable in the slots and projecting from both sides of the plate, means for moving the members simultaneously comprising a rotatable grooved member, and anti-friction rollers on the said members back of the plate for engaging in the groove of the said rotatable members.

10. In a meat-holding device, a plate with radiating slots, meat-engaging members slidable in the slots and projecting beyond both sides of the plate, an anti-friction roller at the end of each member back of the plate, means for releasably holding the roller in place, and a member pivoted on the plate having a groove in which the rear ends of all of the meat-engaging members project for moving them simultaneously in their slots.

11. In a meat-engaging device, a plate having a plurality of slots, meat-engaging members slidable in the slots and projecting beyond the plate on both sides thereof, pointed tines carried by said member having their pointed ends directed toward a common center, means for engaging said members on the rear side of the plate for moving them simultaneously and preventing their disengagement from the slots, and means in connection with each of said members to prevent disengagement from the slot in the other direction.

12. In a meat-holding device, a slotted plate, meat-engaging members slidable in the slots, a grooved member pivoted to the back of the plate for engaging the rear ends of said members and moving them simultaneously in their slots, each member comprising a rectangular portion slidable in the slot with a portion of the reduced section at one end, an intermediate shoulder, a washer mounted on said shoulder and greater in diameter than the width of the slot, a sleeve member mounted on the portion of reduced section, an anti-friction ring surrounding a portion of said sleeve member, and means at the end of the reduced portion for holding the sleeve and washer on the said meat-engaging members.

13. In a meat-holding device, a slotted plate having its lower edge straight and arranged to rest upon a supporting platform; meat-engaging members each slidable in the plate having a portion wider than the slot on one side of the plate and attachable means on the other side of the plate to hold the members in connection with the plate, and means for engaging and moving the said members in their slots.

14. A meat holder for slicing machines comprising a frame member, means for holding said member rigidly on the reciprocating table of a slicing machine, meat engaging members having radially arranged tines thereon with inwardly directed pointed ends, and means for moving said members in the direction of said pointed tines to cause said tines to grip a piece of meat.

In testimony whereof I have signed my name to this specification, on this 14th day of July, A. D. 1916.

HENDRIK STUKART.

Copies of this patent may be obtained for five cents each, by addressing the "Commissioner of Patents, Washington, D. C."